United States Patent
Fann

[11] Patent Number: 5,941,586
[45] Date of Patent: Aug. 24, 1999

[54] OBJECT RETRIEVAL AND GRASPING DEVICE

[76] Inventor: Martin D. Fann, 2125 W. Amelia St., Orlando, Fla. 32805

[21] Appl. No.: 09/005,550

[22] Filed: Jan. 12, 1998

[51] Int. Cl.[6] .................................................. B25J 1/00
[52] U.S. Cl. ......................... 294/19.1; 294/24; 294/104
[58] Field of Search .............................. 294/1.4, 19.1, 294/22, 23, 24, 50.9, 51, 104

[56] References Cited

U.S. PATENT DOCUMENTS

| | | | |
|---|---|---|---|
| 269,971 | 1/1883 | Swett et al. | 294/22 |
| 1,989,932 | 2/1935 | Junkin | 294/50.9 |
| 3,601,835 | 8/1971 | Morgan | 294/19.1 |
| 3,937,512 | 2/1976 | Baughman | 294/19.1 |
| 4,057,276 | 11/1977 | Currie | 294/19.1 |
| 4,441,746 | 4/1984 | Corboy, Jr. | 294/19 |
| 4,547,010 | 10/1985 | Camp | 294/50.9 |
| 4,753,473 | 6/1988 | Arnett | 294/19.1 |
| 4,930,824 | 6/1990 | Matthews et al. | 294/19.1 |
| 4,953,347 | 9/1990 | Siegfried | 56/400.12 |
| 4,962,957 | 10/1990 | Traber | 294/19.1 |
| 5,060,329 | 10/1991 | Hudson | 7/107 |
| 5,415,446 | 5/1995 | Olson et al. | 294/19.1 |
| 5,458,385 | 10/1995 | Peeples | 294/19.1 |
| 5,806,902 | 9/1998 | Kliest | 294/19.1 |

FOREIGN PATENT DOCUMENTS

| | | | |
|---|---|---|---|
| 1329639 | 5/1963 | France | 294/22 |

*Primary Examiner*—Dean J. Kramer
*Attorney, Agent, or Firm*—Saliwanchik, Lloyd & Saliwanchik

[57] ABSTRACT

A device for retrieving and grasping objects from swimming pools and other inaccessible places having a pair of pivotally connected jaws (8, 9) with gripping tips (11, 12) connected to an elongated shaft (4) by a common connector (41). The jaws are preferably maintained in a biased-opened position by a compression spring (22) or spring clip (25) mounted between an extension (15) and the common connector. A pull cord (5) attached to the extension is used to close the jaws. The handle (6) attached to the end of the pull cord aids in pulling the cord and locking the cord to the shaft by an open loop (18) on the handle so as to maintain the jaws in a closed position while retrieving an object. Material having a high coefficient of friction, such as abrasive material like sandpaper or gripping material like rubber, may be attached to the jaw tips or the surfaces of the loop of the handle touching the elongated shaft. An optional shovel-like scoop with optional holes and recess may be removably attached to one of the jaws for use in retrieving flat objects or other material which the jaws may not be able to do. The jaws may have teeth (10a, 10b) on the inside grasping surfaces to pick-up larger objects which will not fit between the jaw tips. The pull handle may have slots (6, 37) for attaching the pull cord and recesses (39a, 39b) for wrapping any excess pull cord around it.

16 Claims, 2 Drawing Sheets

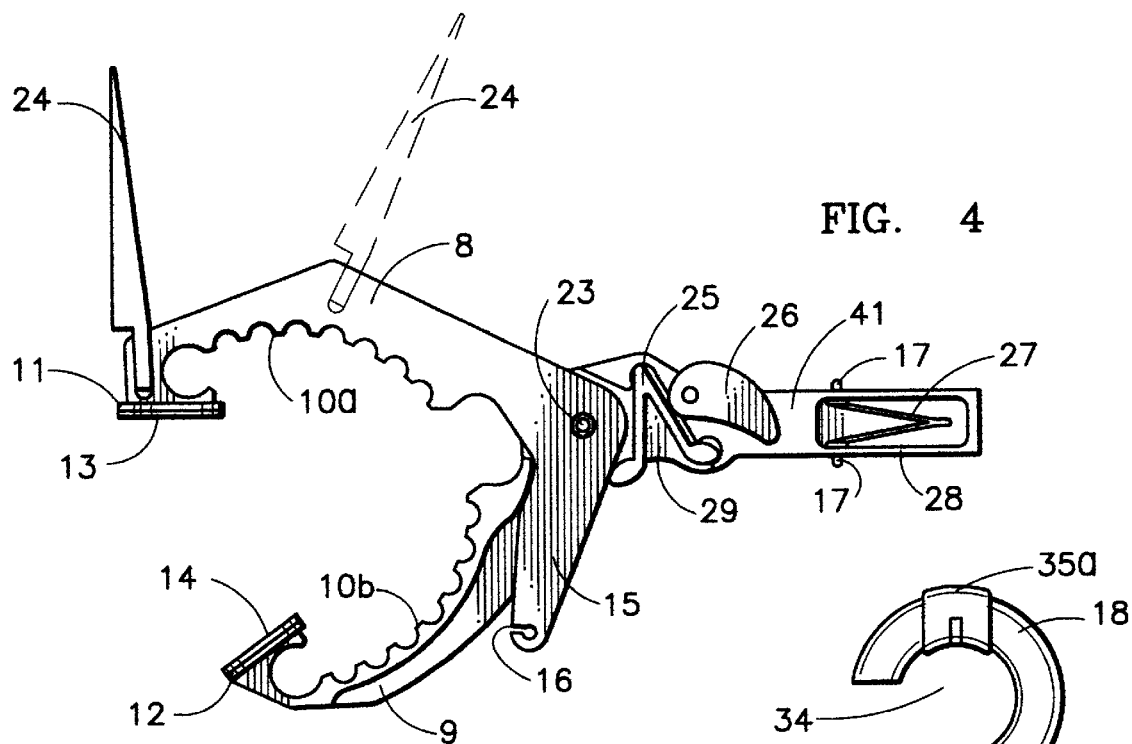
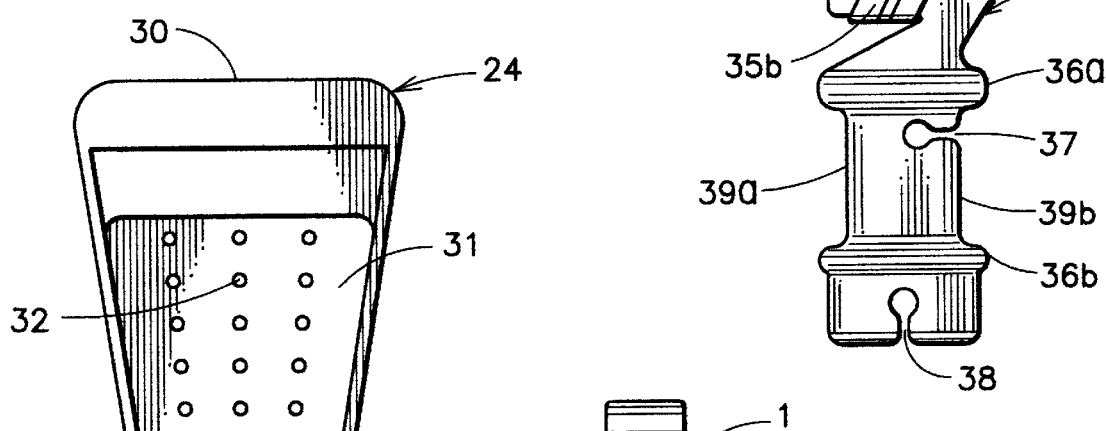
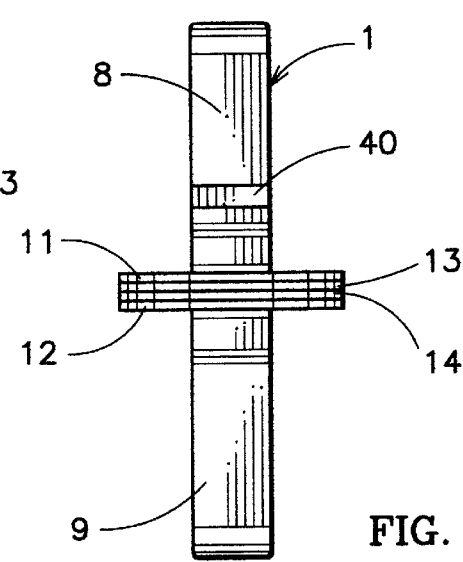

OBJECT RETRIEVAL AND GRASPING DEVICE

BACKGROUND OF THE INVENTION

This invention relates to object retrieval and grasping devices and more particularly, to a jaw-like grasper mounted on an elongated pole primarily for retrieving objects from swimming pools and other inaccessible areas.

Retrieving objects from inaccessible areas, particularly the bottom of swimming pools, has always been a problem. In the case of swimming pools, if a small object, such as a rock or coin, is on the bottom, it usually cannot be removed without going into the pool water which may be too cold or too deep for a person to do so safely and comfortably. Some manufacturers make swimming pool cleaning devices, such as brushes, nets and vacuums, but such devices usually cannot be used to remove such objects for various reasons, which include the difficulty in controlling the device, the inability to grasp or scoop up the object and to maintain a grasp on the object during removal.

Thus, there exists a need for a device which can easily retrieve and remove objects from swimming pools and other inaccessible places.

The prior patented art shows some pick-up and retrieval devices, but none has a similar structure or operation as the present invention. For instance, U.S. Pat. No. 4,441,746 issued Corboy, Jr. on Apr. 10, 1994, teaches a pick-up device with jaws mounted on the end of a hollow shaft which is activated by a squeeze handle at the opposite end of the shaft. A compression spring within the shaft keeps the jaws biased in the opened position through a parallelogram mechanism on the jaws. U.S. Pat. No. 4,953,347 issued to Siegfried on Sep. 4, 1990, discloses a dirt pick-up device with a pair of pivotally connected handles with opposing pick-up shovels attached at one end. U.S. Pat. No. 4,962,957, issued to Traber on Oct. 16, 1990, teaches another pick-up device with biased opened jaws at the end of a shaft actuated by a trigger handle at the other end. U.S. Pat. No. 5,060,329 issued to Hudson on Oct. 29, 1991, shows a tweezer-like pick-up tool and wire cutter with a pivoting lever to lock jaws in the closed position. U.S. Pat. No. 5,458,385, issued to Peeples on Oct. 17, 1995, discloses another tool for picking up objects, such as dead animals, which contains spiked jaws, biased opened by leave springs mounted on one end of a shaft which is activated by a squeeze handle connected to the jaw via a pull handle within the shaft.

On the other hand, as will be described in more detail later, the present invention provides a retrieval device with grasping jaws, said device capable of being mounted on a standard swimming pool maintenance-type pole and actuated by a rope or cord attached to a self-locking handle on the other end of the pole.

SUMMARY OF THE INVENTION

The primary object of the present invention is to provide an object retrieval device which can retrieve objects from inaccessible places, such as swimming pools.

Another object of the present invention is to provide such a device which can also be removably attached to a standard swimming pool maintenance-type pole.

A further object of the present invention is to provide such a device which is self-locking in a jaws-closed position to keep objects from dropping or falling from the jaws during the retrieval process.

An even further object of the present invention is to provide such a device which could also be used to scoop up objects using an optionally attachable scoop or shovel attached to one of the grasping jaws.

An additional object of the present invention is to provide such a device that can withstand the harsh elements and maintenance conditions, especially those commonly found in swimming pools, in which a mix of the water, chlorine and acid can reduce the life of any object.

The present invention fulfills the above and other objects by an object retrieval and grasping device attached to an end of a shaft, the device having a pair of pivotally-connected jaws with grasping tips capable of squeezing and holding an object between the tips when the jaws are in a closed position. The jaws are opened and closed by use of a pull cord attached to a lever extension on one of the jaws. The jaws are preferably maintained in a bias opened position by such means as a compression spring or spring clip mounted between the lever extension and a common jaw connector. The device may employ a handle on the end of the pull cord for a user to pull by his/her hand. The handle would preferably contain an open loop for securely locking the pull cord to the shaft in a closed-jaws position around an object. The jaws may optionally have teeth on inside grasping surfaces for wrapping around large objects which may not fit between the jaw tips. Gripping material may be placed on various parts of the device, such as on the grasping surface of the jaw tips and on the inside loop of the handle. Such gripping material may include sandpaper, rubber or hook and loop fastening material. Although the device may be attached to any shaft, it would preferably be attachable to a hollow swimming pool maintenance-type pole by means of a spring retaining clip in the jaw connector, wherein the clip has nipples which extend through holes at the end of the shaft or pole. The device may further have a shovel-like scoop which is removably attachable to at least one jaw for picking up flat objects or dirt and rocks which cannot be picked up easily by the jaws. The scoop may have holes in it for water to pass through and a recess on the top face for holding objects. The handle of the device may have slots and recesses for rolling and wrapping excess pull cord around it.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 4 is a side view of the jaw grasping portion of the device by itself with spring clip biasing means and an optional scoop mounted to one of the jaws;

FIG. 5 is a top view of the optional scoop;

FIG. 6 is an end view of one embodiment of the locking pull handle; and

FIG. 7 is an end view of the grasping jaw portion of the device with the jaws in a closed position.

DESCRIPTION OF THE PREFERRED EMBODIMENT

Figure 1:
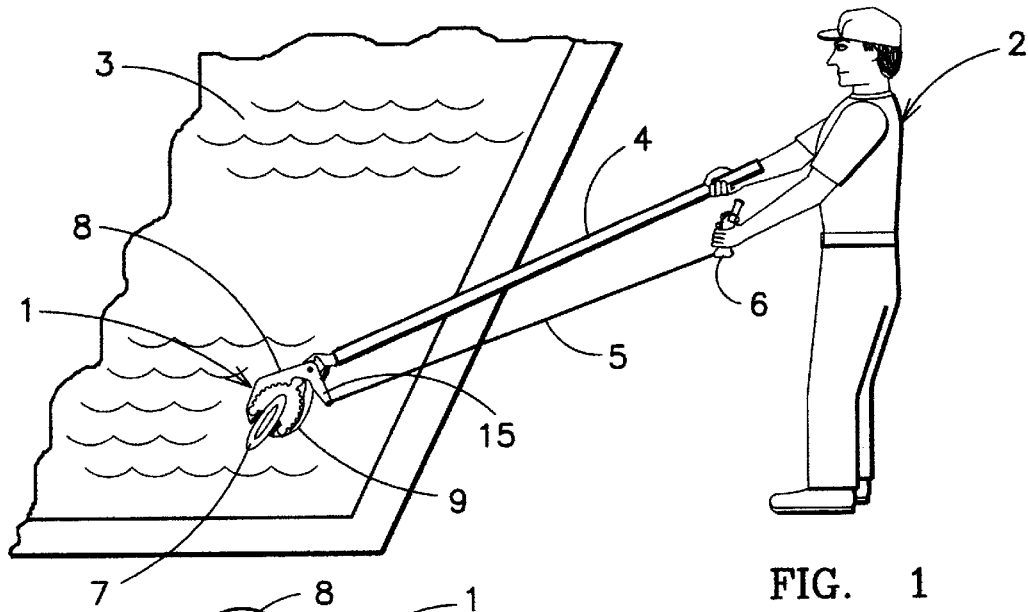
FIG. 1 is a perspective view showing the object and retrieval device of this invention being used by a person to pick-up an object from a swimming pool.

Referring to FIG. 1, the present invention is shown as it might appear being used by a person 2 to remove an object 7 from a swimming pool 3. The grasping device of the present invention 1 is shown secured to the end of a shaft or pole, which in this illustration is a standard swimming pool maintenance-type pole. The grasping jaws 8 and 9 are normally contained in a biased-open position and are closed by means of pulling on a cord 5 which may have a handle 6 at the end of the cord. A pull on the cord 5 toward the user 2 pulls a lever extension 15 on one of the jaws to close the jaws 8 and 9 around an object 7.

Figure 2:
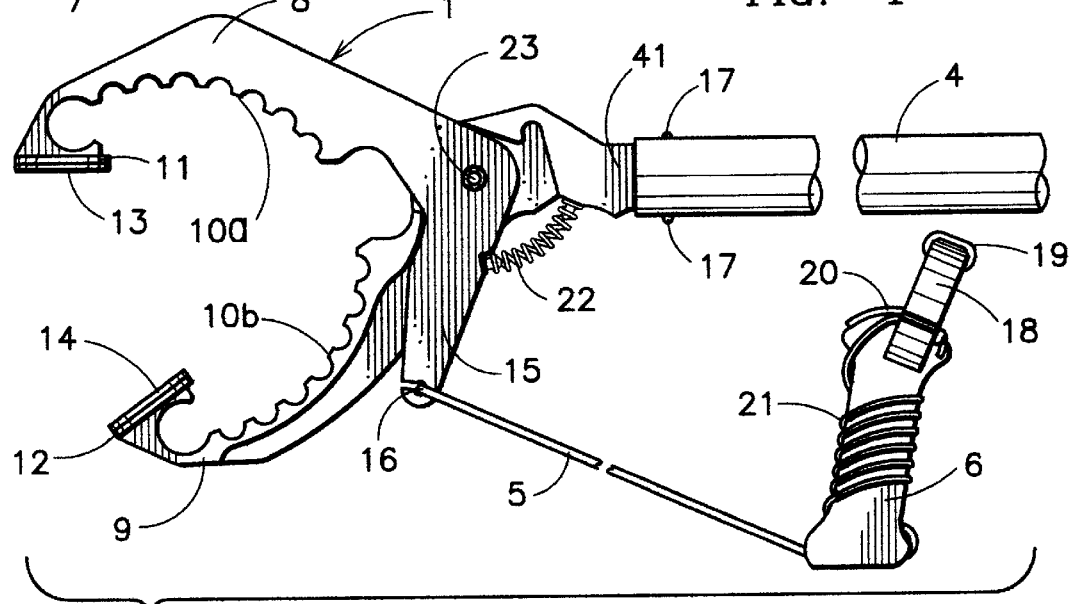
FIG. 2 is a side view showing the retrieval device of this invention with the jaws being maintained in a preferred open position by a compression spring biasing means.
Figure 3:
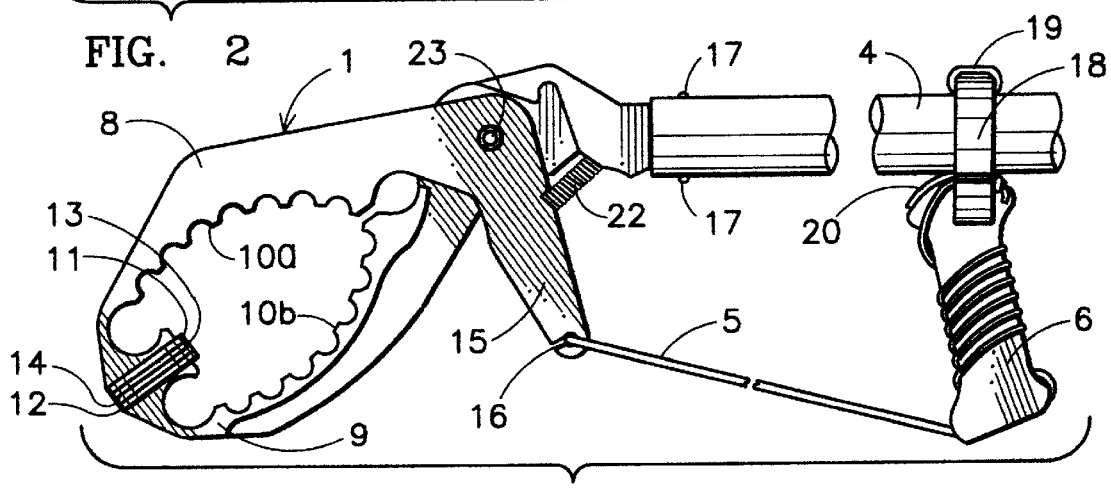
FIG. 3 is a side view of the device showing the jaws in a closed position.

FIGS. 2 and 3 show in more detail the grasping jaw portion of the invention in a biased-open position and closed position, respectively. The pair of jaws comprise an upper jaw 8 and lower jaw 9 which may be maintained in a preferred biased-open position by a compression spring 22 mounted between a lever extension 15 and jaw connector 41. The jaws would be pivotally connected at a common juncture 23, which may be a nut and bolt, preferably made of rigid durable material, such as plastic or metal like stainless steel. The grasping jaws may have jaw tips 11 and 12 which may in addition have gripping material 13 and 14 on the grasping surfaces thereof. The gripping material may include abrasive material, such as sandpaper or Emory paper, rubber or any material having a high coefficient of friction. The pull cord 5 could be attached to the lever extension 15 by a slot 16 or a hole. The pull cord 5 may have a handle 6 attached to its outer end around which excess cord 21 may be wrapped. The top of the handle 6 may have an open loop 18 which can slidably fit around the pole 4 when pulling on the handle. As shown in FIG. 3, the handle 6 would lock on the pole 4 to keep the jaws 8 and 9 in a closed position by the pulling force of the cord 5 on the bottom of the handle 6 which "chocks" the handle around the pole 4. Gripping material 19 and 20 having a high coefficient of friction, such as that discussed above, could be placed on the surface of the handle 6 making contact with the pole 4.

In FIG. 4 alternative and optional features not discussed above are disclosed. Once of these features is a new biased-open means consisting of a spring clip 25 mounted in a recess 29 between the lever extension 15 and common jaw connector 41. The spring clip 25 may be maintained in the recess 29 by a rotating retaining cover 26. Alternatively, the spring clip 25 may be built into the common connector 41.

Another feature not shown in the previous drawing figures is the means of removably attaching the grasping device on the shaft 4 when the shaft is hollow, like the standard swimming pool maintenance-type pole 4. The attachment means comprises a spring clip 27 mounted in a recess of a pole insert 28. The spring clip 27 would have nipples 17 which extend through holes in the circumference of the shaft insert 28 and through the holes in the end of the swimming pool maintenance-type pole 4. An optional spring clip retaining cover 26 is provided.

An optional feature shown in FIG. 4 consists of a shovel-like scoop 24 which can be permanently or removably attached to one of the jaws at various locations as shown. This scoop is further illustrated in FIG. 5. The scooping end 30 of the scoop 24 is preferably inclined like a shovel so it can fit easily under flat objects, dirt or rocks. The scoop may further contain holes 32 in its upper surface for allowing water to flow through, thereby reducing the weight of the grasping device when pulling it from the water and also to keep any object which might float out from doing so. A further optional aid to retain objects within the scoop 24 is provided by a recess or depression 31 in the top face of the shovel 24. A means for removably mounting the scoop 24 onto one of the jaws is provided by a cutout slot 33 which may be inserted into a cutout slot 40 (see FIG. 7) in one of the jaws, such as the upper jaw 8 shown here.

FIG. 6 shows one embodiment of the pulling handle 6. The pull handle 6 may have slots 37 and 38 within which to run the pull cords and secure it by knots in the slots of the handle 6. The handle 6 may further have recesses 39a and 39b for wrapping excess pull cord around the handle, which may be very useful when a short shaft is being used. Of course, in cases where the grasping device of this invention is being used on a long shaft to retrieve or grasp an object a long distance from the user, there will be little, if any, excess pull cord to wrap around the handle 6. At the top of the handle 6 is an open loop 18 wherein the opening 34 is large enough to allow it to be placed around the shaft 4. In this manner the handle 6 can be slid along the pole 4 as the cord 5 is being pulled. When the cord 5 is pulled sufficiently so the jaws 8 and 9 are wrapped around the object being retrieved, the handle 6 is released and becomes locked on the pole 4. Although the handle 6 might still be maintained in a locked position on the shaft 4 even without additional gripping means, gripping material could be added to the gripping surfaces of the handle 6. The gripping material may take many forms, such as sandpaper, hook and loop material or rubber, such as the straps 35a and 35b shown in FIG. 6.

The final illustration in FIG. 7 shows the end view of the grasping jaw portion 1 of the invention in a closed position with the upper and lower jaws 8 and 9, respectively, compressed together at jaw tips 11 and 12 with gripping material 13 and 14 as described previously.

To use the object retrieval and grasping device of this invention to lock the jaws 8 and 9 onto an object, such as 7 shown in FIG. 1, the user 2 only has to pull back on the handle 6 and cord 5 which pulls the lever extension 15 to close the jaws 8 and 9 to bring the jaw tips 13 and 14 together. The handle 6 then locks onto the shaft 4 by a "chocking" action caused by the cord 5 pulling forward on the bottom of the handle 6.

The materials used to construct the device would be rigid material, preferably able to withstand the heat and ultraviolet radiation of hot climates, as well as the damaging effects of fresh or salt water, chlorine, muriatic acid or other chemicals commonly found in a swimming pool.

Although the present invention has been discussed in conjunction with use in a swimming pool, it should be understood that this same device can be used to retrieve and grasp objects from roof tops, trees, fences or any other inaccessible places.

Although only a few embodiments of the present invention have been described in detail hereinabove, all improvements and modifications to this invention within the scope or equivalents of the claims are covered by this invention.

Having thus described my invention, I claim:

1. An object retrieval and grasping device attached to the end of an elongated shaft, said device comprising:
   a pair of pivotally connected jaws having object grasping tips capable of squeezing and holding an object between the tips when the jaws are in a closed position, said jaws having means for biasing the jaws in an open position;

a pull cord attached to an extension on one of the jaws for controlling the opening and closing of the jaws, said jaws having a common jaw connector for attachment to the shaft; and a handle attached to the end of the pull cord for a user to pull on to control the opening and closing of the jaws, said handle having an open loop for locking the handle to the shaft to maintain the jaws in a closed position around an object wherein said handle can be slidingly adjusted to lock at any location along said shaft.

2. The device of claim 1 wherein the means for biasing the jaws in an open position comprises a compression spring mounted between the extension on one of the jaws and the common jaw shaft connector.

3. The device of claim 1 wherein the means for biasing the jaws in an open position comprises a spring clip mounted between the extension on one of the jaws and the common jaw shaft connector.

4. The device of claim 1 wherein the jaws have teeth on inside grasping surfaces for wrapping around large objects which do not fit between the jaw tips.

5. The device of claim 1 further comprising gripping material having a high coefficient of friction on gripping surfaces of the jaw tips.

6. The device of claim 5 wherein the gripping material is sandpaper.

7. The device of claim 5 wherein the gripping material is rubber.

8. The device of claim 1 wherein the shaft is a hollow pole having holes on the end thereof and the jaw connector has means for mounting the pair of jaws to the pole consisting of a spring containing clip with nipples in the common jaw connector, said nipples which extend through the holes in the end of the shaft.

9. The device of claim 1 further comprising a shovel-like scoop mounted to at least one jaw for picking up objects which may be difficult to pick-up between the jaws.

10. The device of claim 9 wherein the scoop has holes in it for water to pass through.

11. The device of claim 10 wherein the scoop has a recess in the top face for more securably holding objects being removed by the device.

12. The device of claim 9 wherein the scoop has a recess in the top face for more securably holding objects being removed by the device.

13. The device of claim 1 wherein the handle has slots for holding and wrapping the pull cord around the handle.

14. The device of claim 1 wherein the handle has gripping material having a high coefficient of friction on an inside surface of the open loop thereof.

15. The device of claim 14 wherein the gripping material is sandpaper.

16. The device of claim 14 wherein the gripping material is rubber.

* * * * *